June 14, 1955  J. F. EMERSON  2,710,942
ELECTROMAGNETIC INDUCTION DEVICE
Original Filed May 29, 1942  2 Sheets-Sheet 1

INVENTOR.
JOHN F. EMERSON
BY Stephen Cerstvik
ATTORNEY.

June 14, 1955  J. F. EMERSON  2,710,942
ELECTROMAGNETIC INDUCTION DEVICE
Original Filed May 29, 1942  2 Sheets-Sheet 2

INVENTOR:
JOHN F. EMERSON,
BY Stephen Cerstvik
ATTORNEY.

United States Patent Office 2,710,942
Patented June 14, 1955

2,710,942

ELECTROMAGNETIC INDUCTION DEVICE

John F. Emerson, Hasbrouck Heights, N. J., assignor to Bendix Aviation Corporation, Teterboro, N. J., a corporation of Delaware Continuation of abandoned application Serial No. 445,102, May 29, 1942. This application March 23, 1950, Serial No. 151,402

17 Claims. (Cl. 324—43)

The present invention is a continuation-in-whole of the invention disclosed and claimed in abandoned application Serial No. 445,102, filed May 29, 1942, and relates to an electromagnetic induction device or magnetic pick-up unit that responds to magnetic fields, and that can be used, for example, as a magnetometer to measure the intensity of a magnetic field, or as an earth inductor compass to indicate the direction of the earth's magnetic field, or as a magnetic pick-up device to provide a controlling function for remote indication or automatic steering of marine vessels or aircraft.

Devices of this general type consist of a core of magnetically permeable material arranged to be traversed by the magnetic field to be measured, and having wound thereon an exciting or energizing winding adapted to be energized by a source of alternating current, and an output winding which is adapted to be connected to a measuring or controlling circuit. Such devices are known in the art as represented by the patent to La Pierre No. 2,053,154, for example, which discloses the use of such a device both as a magnetometer and as an earth inductor compass.

Other devices of this general type used to indicate the direction of the earth's magnetic field are disclosed in the patent to A. A. Stuart, Jr., No. 2,261,309, and in Reissue Patent No. 22,699 of A. A. Stuart, Jr., and in Patent No. 2,308,566 of P. A. Noxon, said three patents being assigned to the same assignee as the present invention.

In the prior art devices disclosed in the aforementioned patents, the operation is based on the use of a single closed core of magnetically permeable material, as in the La Pierre patent, or a plurality of such cores arranged to extend radially about a common point, as in the Stuart Patent No. 2,261,309, each core having at least two legs to provide a pair of parallel magnetic paths adapted to be subjected to the magnetic field to be measured. An alternating current supply winding is wound on each leg, and the winding of one leg is connected in series-opposed relation to the winding of the other leg. Then an alternating current output or detector winding is wound on the core, whereby a second harmonic voltage is generated in said output winding, said output voltage being a measure of the strength of the detected field.

Although the aforesaid prior art devices operated fairly satisfactorily and served the purposes for which they were intended, they had certain inherent disadvantages that did not render them as efficient or as accurate as might be desired. For example, they were subject to errors caused by residual magnetism in the cores due to the fact that all parts of the cores were not traversed by the reversing saturating flux produced by the energizing current of the supply windings and, therefore, these devices were not entirely satisfactory, especially when detecting or measuring a relatively weak magnetic field such as the earth's field.

Additional errors were caused in the prior art devices due to the fact that the cores were of the closed type and the permeability of the magnetic material was not uniform, so that the permeability of one leg was either greater or less than that of the other leg, thereby producing unequal flux densities in the legs of the cores by the energizing current, and, therefore, preventing complete cancellation of the fluxes produced by the supply windings when no external field was present. Complete cancellation of these fluxes is desirable in order to prevent the fundamental frequency and odd harmonics of the exciting current from being present in the output windings when no external field is present, especially when a pulsating direct current instead of an alternating current is used as the exciting or energizing current, because it is not possible to separate the fundamental frequency produced by the exciting flux and the fundamental frequency produced by the flux of the external magnetic field being measured.

Moreover, the devices of the prior art did not have a linear relation between the output voltage and the effective strength of the magnetic field being measured, it being well known that the permeability of most ferromagnetic materials used for this purpose is not constant. "Mu-metal," for example, while having some desirable characteristics, shows a variation in permeability from an initial value of about 14,000 minimum to about 61,500 maximum, thereby making it normally ineffective to produce such a linear relation. A linear relation between the output voltage and the effective field strength is, however, extremely desirable when the magnetic pick-up device is to be used as an earth inductor compass, for example, which depends for its operation on a voltage which changes as the cosine of the angle between the magnetic axis of the device and the direction of the earth's field.

Accordingly, one of the objects of the present invention is to provide a novel and improved magnetic field pick-up device, whereby the foregoing disadvantages and difficulties are overcome, and errors heretofore obtained are substantially eliminated.

Another object of the invention is to provide a novel device of the class described, which is so constructed and arranged that the relation between the output voltage of the device and the effective strength of the field being measured or detected is substantially linear, whereby the device becomes particularly adaptable for use as an earth inductor unit or as a magnetic pick-up from a magnetic compass in order to indicate the direction of the earth's magnetic field.

Another object is to provide a novel and improved electromagnetic induction pick-up device which is more sensitive and more accurate than prior devices of this type.

Another object is to provide a novel magnetic field pick-up device which may be used by itself to indicate the strength and/or direction of a magnetic field, or in combination with two or more similar devices arranged in predetermined geometrical relation so as to provide a plurality of output voltages which are a function of the strength and direction of the field being measured and which may be combined or used separately for indication or control purposes.

A further object is to provide a novel magnetic field pick-up device arranged with two other similar devices in a predetermined geometrical relation to form a non-directional device for measuring magnetic field strength, whereby the strength of the field can be measured regardless of the orientation of the measuring device in said field.

Still another object of the invention is to provide a novel magnetic field pick-up device arranged with two other similar devices in such a manner that all three are mutually perpendicular and intersect or bisect each other to form a non-directional device for measuring field strength, whereby the strength of the field can be measured regardless of orientation of said device in said field.

A still further object of the invention is to provide a novel magnetic field pick-up device comprising an elongated core of magnetically permeable material with input and output windings thereon and having a ratio of length to cross-sectional area such that substantial linearity is obtained between the output voltage and the effective strength of the magnetic field to which the device is subjected.

Another object is to provide a novel magnetic field pick-up device comprising an elongated core of magnetically permeable material with input and output windings thereon, said core having a relation of flux density to field strength represented by the following equation:

$$B = H_0 \frac{u}{1+Ku}$$

where $B$ = flux density of the material
$H_0$ = field strength when no magnetic material is present
$u$ = permeability of the material and having an initial value between 10,000 and 21,000 and a maximum value between 61,500 and 105,000.
$K$ = demagnetization factor having a minimum value of .000321, the length of said core being less than 122 times the square root of its cross-sectional area.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for purposes of illustration only and are not to be construed as defining the limits or scope of the invention, reference for the latter purpose being had to the appended claims.

In the drawings wherein like reference numerals refer to like parts in the several figures.

Figure 1:
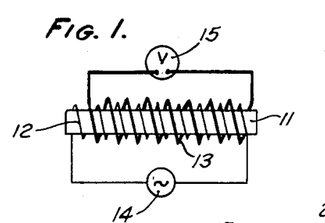
Fig. 1 is a schematic diagram of one of the simplest known forms of pickup-device, which is shown here merely to illustrate the principle upon which the present invention is based.

The non-linear relation between magnetizing force and magnetic flux that characterizes the so-called ferro-magnetic materials is well known but in order to better understand the principle underlying the present invention reference is made to Fig. 1 of the drawings. If a core 11 of such magnetically permeable material has wound thereon an input or energizing winding 12, and an output or secondary winding 13 is also wound around the core 11, and then an alternating current is caused to flow in the energizing winding 12 from a suitable source 14, the periodically reversing flux produced in the core will generate an alternating voltage in the output coil 13, said voltage being indicated by a suitable voltmeter 15. This theory is well known and is that of an open core transformer. As the current is increased, however, a condition known as saturation occurs during the time that the current is at its maximum values. This will cause harmonics to be added to the fundamental voltage generated in the output coil. If the saturating current is sinusoidal and the only magnetizing force acting on the core is the flux produced by said current, the harmonics will all be odd multiples of the fundamental frequency. This is true because the flux produced during the positive flow of exciting current is the same as that produced when the current flows in the opposite direction except that the polarity is reversed. When a constant uni-directional magnetic field, which ordinarily would induce no voltage in the output coil, acts on the core while this saturating current flows, the change of flux for positive and negative half cycles of current will not be equal, because during one half cycle of the exciting current, the flux produced thereby opposes the flux of the constant field and during the other half cycle the flux of the constant field is aided by the flux produced by the exciting current. Under this condition even harmonics of the fundamental frequency will be generated and, as is well known, the fundamental and odd harmonic components reverse phase when the direction of the exciting current is reversed, but the even harmonics do not. The constant uni-directional magnetic field which acts on the coil and which is to be measured or its direction indicated, is an external field and may be the earth's magnetic field or the magnetic field of a compass needle.

Now, if a closed core having at least two legs is used to provide a pair of parallel magnetic paths, as in the aforesaid La Pierre Patent No. 2,053,154, and separate supply windings are wound on the two legs and connected in series-opposed relation so that the current in the two windings flows in opposite directions, only the even harmonic voltages will be induced in the output coils, because the fundamental and odd harmonic components from each leg will be equal in amplitude but opposite in phase, thereby cancelling each other, while the even harmonic components from each leg will be equal and in aiding phase relation, thereby increasing the output voltage which will consist of even harmonics only, principally the second harmonics.

Present manufacturing technique of permeable ferromagnetic materials, however, does not assure identical magnetic characteristics of such materials, not even for adjacent areas on a single specimen, and, therefore, when a single closed core of such material is used, as in the prior art devices, it is not possible to obtain complete cancellation of the fundamental and odd harmonic components from the two legs of the core, because the permeability of one leg may be greater or less than that of the other leg, thereby causing the fundamental and odd harmonic voltages from one leg to be greater or less than those from the other leg.

Also, when a single closed core with a plurality of parallel legs was used, it was found that a linear relation did not exist between the output voltage of the pick-up device and the effective strength of the magnetic field being measured, this being due partly to the non-uniformity of the magnetic characteristics of the two legs and partly to the fact that when a body is temporarily magnetized, it retains part of the magnetism.

Figure 2:
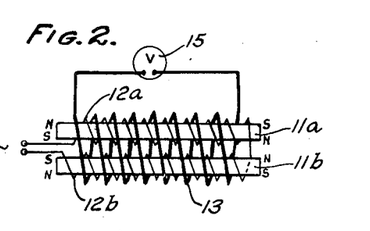
Fig. 2 is a schematic diagram of one embodiment of the present invention.

In accordance with the present invention, a novel structure is provided in which the fundamental and odd harmonic components are eliminated and only the even harmonic voltages are induced in the output winding of the device, and one in which there is substantially linear relation between the output voltage and the effective strength of the magnetic field being measured. One embodiment of such novel structure is shown in Fig. 2 and, as illustrated, comprises a pair of spaced parallel core members 11a and 11b of magnetically permeable material having substantially identical magnetic characteristics and arranged to be traversed by the uni-directional magnetic field to be measured. On each of these core members 11a and 11b are wound separate input or energizing windings 12a and 12b respectively, which are connected in series-opposed relation so that the instantaneous magnetic flux of winding 12a is in opposition to the instantaneous magnetic flux of winding 12b, and said windings 12a and 12b are energized by alternating current from a suitable source like source 14 shown in Fig. 1., which may be an alternating current generator or alternator or an oscillator. An output or secondary winding 13 is then wound about both of the core members 11a, 11b as though they were a single unit, and about the exciting windings 12a and 12b. The output winding 13 may then be connected to the measuring instrument 15 which may be a millivolt meter if the generated voltage is not amplified or a voltmeter if amplification is employed. Thus, by combining two identical core members and providing identical but separate excitation coils on these core members, and connecting said coils in series-opposed relation, current in these coils flows in opposite directions, and, therefore, only the even harmonic voltages are induced in the output winding 13 since the fundamental and odd harmonic components from each core will be equal in amplitude and opposite in phase while the even harmonic components will be equal in amplitude and in aiding phase relation. The amplitude and polarity of the even harmonics will be determined by the magnitude and relative direction of the constant uni-directional magnetic field being measured, as these factors determine the operating point of the magnetization curve.

It is specifically pointed out that the exciting windings 12a and 12b should be so wound on their cores 11a and 11b, respectively, as to cover them completely in order to saturate all of the magnetic material of said cores, thereby preventing said cores from becoming magnetized by any external field that may be measured. In other words, residual magnetism which might be caused in the cores by the external field is prevented from remaining in said cores. This means that the operating point of the magnetization curve of the cores is shifted only while some magnetic force other than that produced by the saturating current is acting on said cores, thereby eliminating errors due to retentivity.

As has been previously pointed out, present manufacturing technique does not assure identical magnetic characteristics of the known ferro-magnetic materials, but the use of two separate cores in accordance with the present invention as shown in Fig. 2 permits matching of the two cores so that two may be obtained that have substantially identical magnetic characteristics.

As has also been previously pointed out, it is extremely desirable and in some cases necessary that a linear relation exist between the voltage output of the output coil 13 and the effective strength of the field being measured. When the device of the invention is used as a pick-up device of a magnetometer, the output voltage of the coil 13, as read on voltmeter 15, will be proportional to the effective field strength, and when used as an earth inductor of an earth inductor compass or as a pick-up device that depends for its operation upon the output voltage changing as the cosine of the angle between the magnetic axis of the pick-up device and the direction of the magnetic field, such as the earth's field, for example. In both cases this linear relation becomes necessary.

Such a linear relation, however, could not be obtained heretofore because of the fact that the permeability of most of the known ferro-magnetic materials is not constant but changes from an initial value to a maximum value as will be seen from the following table for 3.8–78.5 molybdenum "Permalloy" (3.8% molybdenum, 78.5% nickel, 17.7% iron), 3.8–78.5 chromium "Permalloy" (3.8% chromium, 78.5% nickel, 17.7% iron), "Mu-metal," and 78.5 "Permalloy" (78.5% nickel, 21.5% iron).

| Material | Permeability | | Saturation Flux Density in Gauss |
|---|---|---|---|
| | Initial | Maximum | |
| 3.8–78.5 Mo "Permalloy" | 21,000 | 71,000 | 8,800 |
| 3.8–78.5 Cr "Permalloy" | 14,000 | 63,000 | 8,000 |
| "Mu-metal" | 14,000 | 61,500 | 6,250 |
| 78.5 "Permalloy" | 10,000 | 105,000 | 10,800 |

From the above table, which was compiled from information contained in Bell Telephone System Technical Publication, Monograph B–908, by G. W. Elmen (1935), page 17, Table III, and from a data sheet furnished by Allegheny-Ludnum Steel Corporation, it will be noted that "Mu-metal" saturates at the lowest flux density and this is a decided advantage in certain cases where less excitation power is desired for operating the pick-up device of the invention. The 3.8–78.5 "Permalloy" saturates most abruptly and, therefore, a pick-up device having cores of this material will give a somewhat greater output voltage than one having cores of the other materials.

It will now be shown that by meeting certain requirements in accordance with the present invention, the non-linearity of the permeability of the core materials can be made negligible under desired operating conditions.

It is known that when a magnetizable body is magnetized by induction, the induced magnetism weakens the field that produces it. See page 37 of the text-book entitled "Magnetic Phenomena" by S. R. Williams, first edition (1931), published by McGraw-Hill Book Company, Inc., New York and London. Accordingly, this fact must be taken into consideration in order to determine the effective strength of the magnetizing field and, therefore, to do this the usual equation $$H = \frac{B}{u}$$

must be modified as follows:

$$H = H_0 - KB \qquad (1)$$

where
$H$ = the effective field or $\frac{B}{u}$
$u$ = permeability
$H_0$ = field strength when no magnetic material is present
$B$ = flux density in the material
$K$ = the demagnetization factor Now, by transposing Equation 1 we get $$H_0 = H + KB \qquad (2)$$

Then by substituting $uH$ for $B$ in Equation 2 we get $$H_0 = H(1 + Ku) \qquad (3)$$

and dividing both sides of Equation 3 by $(1+Ku)$ we get $$H = \frac{H_0}{1+Ku} \qquad (4)$$

Then by multiplying both sides of Equation 4 by $u$ we finally get $$uH = H_0 \frac{u}{1+Ku} = B \qquad (5)$$

Thus Equation 5 shows that the relation of $B$ to $H_0$ depends on $$\frac{u}{1+Ku}$$

$K$, the demagnetization factor, is a constant largely determined by the ratio of length to diameter $L/D$ of the material when in an unsaturated condition. Values of $K$ for various conditions have been determined by Schuddemagen and others and are available in the "International Critical Tables." See also page 211 of Williams' "Magnetic Phenomena," where tables of values of $K$ are given for ratios of $L/D$ from 10 to 200 for rods of ⅛ inch diameter and ¼ to ¾ inch diameter.

The following is a portion of these tables, showing the values of $K$ for ratios of $L/D$ of 10 to 200, respectively, when the specimen of magnetic material is in the form of a rod ⅛ inch in diameter:

| L/D | K | L/D | K |
|---|---|---|---|
| 10 | 0.0175 | 60 | 0.00091 |
| 15 | 0.0093 | 70 | 0.00069 |
| 20 | 0.0059 | 80 | 0.00055 |
| 25 | 0.0041 | 90 | 0.000445 |
| 30 | 0.00304 | 100 | 0.000366 |
| 35 | 0.00235 | 125 | 0.000247 |
| 40 | 0.00186 | 150 | 0.000177 |
| 45 | 0.00152 | 175 | 0.000132 |
| 50 | 0.00127 | 200 | 0.000103 |

Upon examination of Equation 5 it will be seen that substantial linearity can be obtained in accordance with the present invention by making the core of the magnetic pick-up device of a material having pre-selected initial and maximum permeabilities and a ratio of length to diameter or cross-sectional area such that $Ku$ is large as compared to unity.

The extent of linearity of the relation between the output voltage and the effective strength of the field may be readily determined by determining the ratio of the output voltage at maximum permeability to the output voltage at minimum permeability by the use of Equation 5 as follows:

$$H_0 \frac{u_m}{1+Ku_m} = rH_0 \frac{u_0}{1+Ku_0} \qquad (6)$$

$H_0$ cancels out since it appears on both sides of the equation, and then $$r = \frac{u_m}{u_0} \cdot \frac{1+Ku_0}{1+Ku_m} \qquad (7)$$

where $u_0$ = initial permeability of the core material
$u_m$ = maximum permeability of the core material
$K$ = demagnetization factor
$r$ = ratio of output voltage at maximum permeability to output voltage at initial permeability.

As an example, if the magnetic material used for the cores is 3.8–78.5 molybdenum "Permalloy," we can determine what the ratio of $L/D$ should be for linearity of ±5% ($r$=1.1) by using Equation 7 and substituting therein the permeability values of said "Permalloy" as follows:

$$1.1 = \frac{71{,}000}{21{,}000} \cdot \frac{1+21{,}000K}{1+71{,}000E}$$

$$K = .000321$$

Then from the table showing the ratio of $L/D$ for different values of $K$ we find that for $K$=.000321, the ratio of $L/D$ is 108.

Similarly, by using Equation 7 for 3.8–78.5 chromium "Permalloy," "Mu-metal," and 78.5 "Permalloy," the following values of $K$ and $L/D$ will be found for a ±5% maximum allowable error in linearity:

| Material | K | L/D |
|---|---|---|
| 3.8–78.5 Cr "Permalloy" | 0.000539 | 81 |
| "Mu-metal" | 0.000614 | 75 |
| 78.5 "Permalloy" | 0.000895 | 60 |

Thus, it is seen that for a maximum allowable error of ±5% in linearity due to variation in permeability of the materials listed above, $K$ varies from 0.000321 to 0.000895, and $L/D$ varies from 60 to 108. Since ±5% departure from linearity is probably the largest error that may be tolerated in a practical device for measuring the strength of a magnetic field or for indicating its direction, the ratio of $L/D$ should be less than 108.

Applying Equation 7 and using the table of ratios of $L/D$ and values of $K$, it will be found that a suitable ratio of $L/D$ for the minimum error in linearity for each of the above-mentioned materials is as follows:

| Material | L/D | Percent Error in Linearity |
|---|---|---|
| 3.8–78.5 Mo "Permalloy" | 30 | ±0.60 |
| 3.8–78.5 Cr "Permalloy" | 30 | ±0.80 |
| "Mu-metal" | 30 | ±0.95 |
| 78.5 "Permalloy" | 30 | ±1.50 |

If a magnetic material is used which has relatively low permeability as, for example, an initial permeability of about 1000 and a maximum of about 2000 and making the ratio of $L/D$=60, it will be found that the linearity error would be ±18%. The calculation is as follows:

$$r = \frac{2000}{1000} \times \frac{1+.0009 \times 1000}{1+.0009 \times 2000}$$

$$= \frac{2}{1} \times \frac{1+0.9}{1+1.8} = \frac{2 \times 1.9}{2.8} = 1.36$$

Thus, the total departure from linearity is 36% or ±18%.

From the foregoing solution, it is clear that $Ku$ must be large as compared to unity in order that a linear relation will exist between the output voltage and the effective field strength. This is further verified by applying Equation 7 to the molybdenum "Permalloy" having an initial permeability of 21,000 and a maximum of 71,000, and using a ratio of $L/D$=30, $K$ being 0.003. The calculation is as follows:

$$r = \frac{71{,}000}{21{,}000} \cdot \frac{1+.003 \times 21{,}000}{1+.003 \times 71{,}000}$$

$$= \frac{71}{21} \cdot \frac{1+63}{1+213} = \frac{71 \times 64}{21 \times 214} = 1.012$$

giving a total error of only 1.2% or an error of ±0.6%.

In actual practice and as shown in the drawings the core members are not round rods but have a rectangular cross-section and each core 11a is made up of two laminations, each lamination being 4 inches long, 0.015 inch thick and 0.090 inch wide. The laminations are made of "Mu-metal" having an initial permeability of 14,000 and a maximum of 61,500. The secondary winding or output coil 13 has 1200 turns.

The total cross-sectional area of the two cores (4 laminations) is as follows:

$$\text{Area} = 4 \times 0.015 \times 0.090 = .0054 \text{ sq. in.}$$

but $$\text{Area} = \frac{\pi D^2}{4} = .0054 \text{ sq. inch}$$

$$= .0348 \text{ sq. centimeter}$$

D being the equivalent diameter. Therefore:

$$D^2 = \frac{4 \times .0054}{3.1416} = \sqrt{1.27 \times .0054}$$

$$D = .0828 \text{ inch}$$

$$\frac{L}{D} = \frac{4}{.0828} = 48.3$$

Then for the table showing the values of K for different ratios of $L/D$ we find that $K = .0014$ for a ratio of 48.3.

Now, applying Equation 7:

$$r = \frac{61,500}{14,000} \times \frac{1 + .0014 \times 14,000}{1 + .0014 \times 61,500}$$

$$= \frac{615}{140} \times \frac{1 + 19.6}{1 + 86.1}$$

$$= \frac{615 \times 20.6}{140 \times 87.1} = 1.038$$

Thus the total departure from linearity in the magnetic pick-up device as actually constructed for use as a magnetometer is only 3.8% or ±1.9%. Such an error is practically negligible.

The output voltage of coil 13 can be determined from the following well known equation $$E = 4.44 NABf 10^{-8} \quad (8)$$

where $E =$ the second harmonic voltage
$N =$ the number of turns of output coil 13
$A =$ cross-sectional area of core in square centimeters
$B =$ flux density in core when excitation current is zero (induced flux from field being measured)
$f =$ twice excitation frequency.

Substituting the value of B from Equation 5 in Equation 8 then $$E = 4.44 NA \left( H_0 \frac{u_0}{1 + K u_0} \right) F 10^{-8} \quad (9)$$

Therefore, for a magnetic field of 0.17 gauss and using an exciting current having a frequency of 400 cycles, the second harmonic voltage in the output coil 13 should be $$E = 4.44 \times 1200 \times .0348 \left( \frac{14,000}{1 + .0014 \times 14,000} \right) 800 \times 10^{-8}$$

$$= .173 \text{ volt (R. M. S.)}$$

It is pointed out that the current in the output coil should not be phased with the fundamental excitation current because such phasing would produce an interaction known as "flux rectification." For normal operation, the crests and valleys of the second harmonic voltage component in the output coil 13 appear at 45 degrees, 135 degrees and 315 degrees of the exciting current wave, and, therefore, if the coil is shunted by a phasing condenser of the proper size and the A. C. resistance of the output circuit is low, a large second harmonic current will be phased so that, as it is increasing during one cycle, the core members 11a, 11b are saturated by the exciting current. As it increases in the opposite direction, the exciting current is below saturation so that a unidirectional flux component appears which aids the external field (H₀). Also, when the output coil 13 is tuned to resonance, the output voltage is affected more by the small changes in inductance produced by a change in the permeability of the cores 11a, 11b. When the pick-up device ends in an inductive and/or resistive load, the circulating current is usually so small and so phased that it has a negligible effect on said cores.

Figure 3:
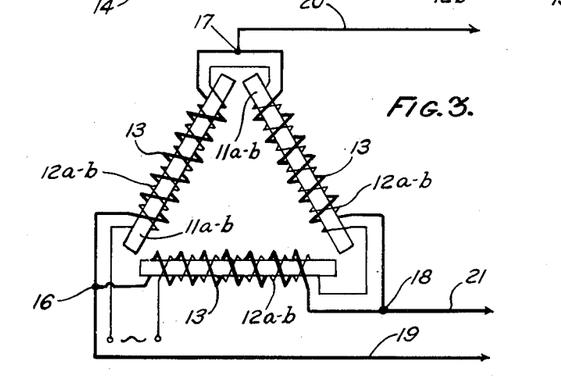
Fig. 3 is a top plan view and schematic diagram of another embodiment in which three similar pick-up devices of the invention as shown in Fig. 2 and viewed from the top thereof, are arranged to form a single triangular pick-up unit adapted for use as an earth inductor of an earth inductor compass of the type disclosed in the aforesaid patent of A. A. Stuart, Jr., Reissue No. 22,699.
Figure 4:
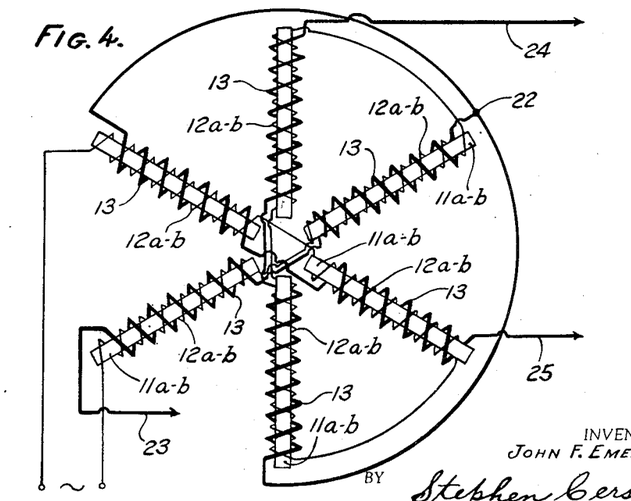
Fig. 4 is a schematic diagram of a third embodiment of the invention involving the use of six similar devices equally angularly spaced and extending radially outward from a common center to form a single unit which may likewise be used as an earth inductor of an earth inductor compass system.
Figure 5:
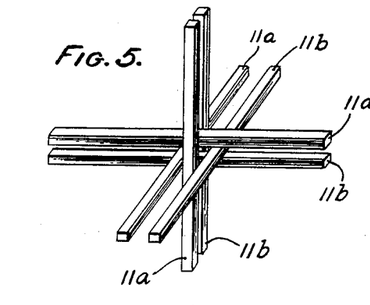
Fig. 5 is an isometric view of another embodiment of the invention, in which three similar pick-up devices are arranged mutually perpendicular to each other and bisecting each other, to form a single magnetic pick-up unit which is non-directional and particularly adapted for use as a field strength measuring device.

In accordance with another feature of the invention, the magnetic field pick-up unit shown in Fig. 2 may be combined with a plurality of like units in the manner shown in Figs. 3 and 4 to provide a single composite unit for use as the earth inductor of an earth inductor compass of the type shown in the hereinbefore mentioned patent of A. A. Stuart, Jr., Reissue No. 22,699.

In Fig. 3 the output coils 13 of the three pick-up units are connected in delta relation at points 16, 17 and 18 to provide a three-phase type output circuit by the output leads 19, 20 and 21, while in Fig. 4 six units are used in three groups of two, each two being diametrically opposed. The output coils of each two units are connected in series relation and then the two of each group are connected in Y-relation at a common point 22 to provide a three-phase type output circuit by means of leads 23, 24 and 25. In both Figs. 3 and 4, the exciting or energizing windings 12a and 12b of each unit are connected in series with the exciting windings of each of the other units and, as previously pointed out, the exciting coils of each unit are connected in series-opposed relation.

The output voltage of each unit in Figs. 3 and 4 varies as the cosine of the angle between the magnetic axis of the unit and the earth's field.

Figure 6:
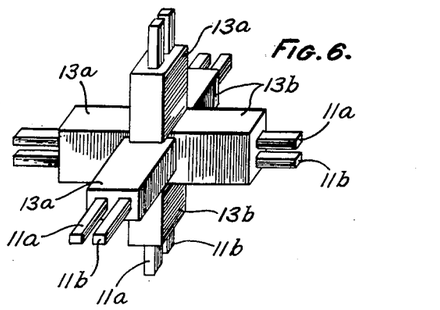
Fig. 6 is another isometric view showing how the core members of the three units of Fig. 5 are combined to form a single pick-up unit, the input and output windings of the units being omitted for purposes of clarity.

According to another feature of the invention, the magnetic field pick-up unit of Fig. 2 is combined with two other identical units in the manner shown in Figs. 5 to 8, and 10 to form a composite non-directional device for measuring the strength of a magnetic field such, for example, as the earth's field, without orienting the device with respect to the field. As shown in Fig. 6, the non-directional device is made up of three pick-up units of the type shown in Fig. 2 and they are arranged mutually at right angles to each other with their cores intersecting each other in the manner shown in Fig. 5, all three units being placed symmetrically about a common central point so that they will not react with each other because the magnetic field of each unit is at right angles to the fields of the other units.

Figure 9:
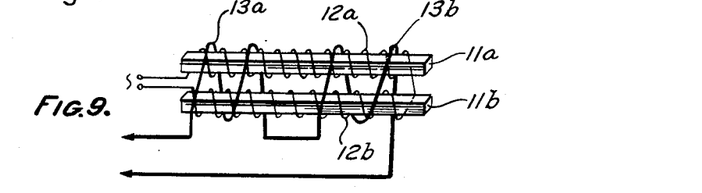
Fig. 9 is a schematic diagram of one of the pick-up units shown in Fig. 5, illustrating how the input and output windings are arranged thereon.
Figure 10:
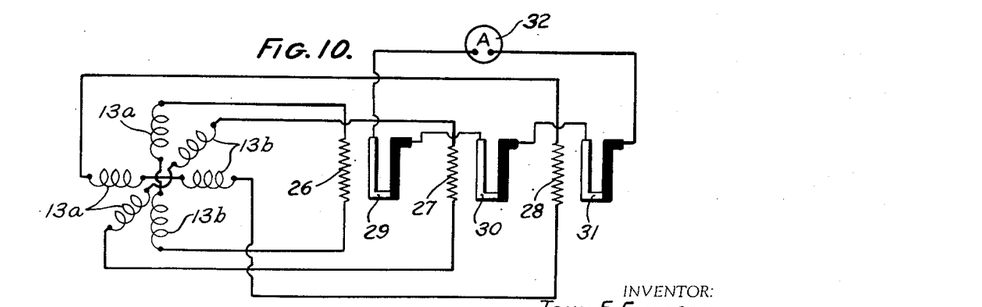
Fig. 10 is a schematic diagram of the three units of Fig. 5, with the core members and input windings omitted, showing how the output coils may be connected to one form of measuring apparatus for measuring the strength of a magnetic field.

In order to have the desired symmetrical arrangement, the output coil of each unit is wound in two sections 13a and 13b as shown in Fig. 9 so that a space is left between the sections to accommodate the other units in the mutually perpendicular arrangement, said coil sections 13a and 13b being connected in series aiding relation, but each pair being independent of the other pairs so as to provide three separate output circuits by means of suitable output leads in the manner shown in Fig. 10.

As shown in Fig. 6, the output coil sections 13a and 13b of each unit are arranged so that the inside face of each forms a hollow cube with the inside faces of the other coil sections. This arrangement makes it possible to use core pieces running the full length.

Figure 7:
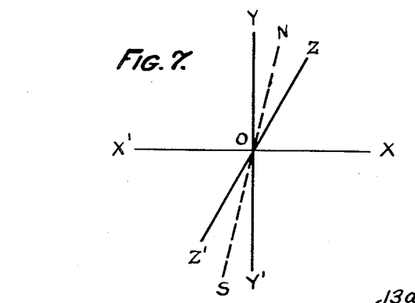
Fig. 7 is a schematic diagram showing the relation of the axes of the three mutually perpendicular pick-up devices of Fig. 5 with respect to a magnetic field being measured.

In Fig. 7, the dotted line NS represents the external magnetic field being measured and the three pick-up units of Fig. 6 are represented by the three mutually perpendicular axes X—X¹, Y—Y¹ and Z—Z¹. Now, the effective field acting on each unit is that component of the external field NS that is parallel to that unit. Since the output voltage of each unit bears a linear relation to the field strength in accordance with the invention, the output voltage from each unit will be as follows:

$$e_x = E \cos \angle NOX \quad (10)$$
$$e_y = E \cos \angle NOY \quad (11)$$
$$e_z = E \cos \angle NOZ \quad (12)$$

where E is the voltage when the axis of each unit is parallel to the external field NS.

Now, from solid trigonometry, it is known that the following relation exists between the trigonometric functions of angles NOX, NOY and NOZ:

$$\cos^2 \angle NOX + \cos^2 \angle NOY + \cos^2 \angle NOZ = 1 \quad (13)$$

and, therefore:

$$e_x^2 + e_y^2 + e_z^2 = E^2 \quad (14)$$

$E^2$ is constant for any given field strength and, therefore, the strength of the field NS can be measured by measuring $E^2$ regardless of the orientation of the composite pick-up unit in said field.

The strength of the field component in a plane formed by two units at right angles can be measured in much the same way because we know that $$\cos^2 \angle NOX + \cos^2 \angle NOY = 1 \quad (15)$$

when cos $\angle NOX +$ cos $\angle NOY = 90°$.

The arrangement of the composite three-unit pick-up device is not restricted to one in which there is a unit in each of three axes mutually perpendicular to each other in the manner shown in Fig. 6, provided interaction among the three units can be avoided.

Figure 8:
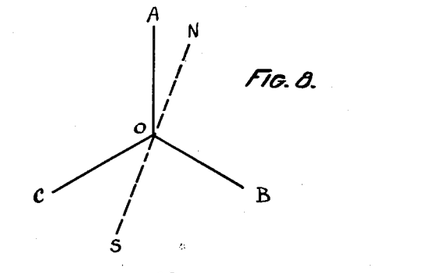
Fig. 8 is another schematic diagram showing the relation of the axes of three similar pick-up units with respect to the magnetic field being measured when the units are in a common plane and are arranged to extend radially outward from a common center and are equally angularly spaced.

Accordingly, in accordance with another feature of the invention, there is shown diagrammatically in Fig. 8 an embodiment in which three units are in a common plane and arranged to extend radially outward from a common point O and angularly spaced 120° apart from each other.

In Fig. 8, AO, BO and CO represent the three separate pick-up units arranged in the manner described above, and the dotted line NS again represents the external magnetic field being measured. The output voltage from each unit will be as follows:

$$e_a = E \cos \angle NOA \quad (16)$$
$$e_b = E \cos \angle NOB \quad (17)$$
$$e_c = E \cos \angle NOC \quad (18)$$

where E is again the voltage when the axis of each unit is parallel to the external field. Hence, $$e_a^2 + e_b^2 + e_c^2 = 1.5E^2 \quad (19)$$

The sum of the squared voltages in Equations 14 and 19 can be measured in several ways, one of which is shown in Fig. 10 and will now be described.

It is known that in a resistance load the power is proportional to the square of the voltage and, therefore, by summing up the squared voltages from the three units, the sum will be proportional to the strength of the external field being measured. In accordance with a final feature of the present invention, Fig. 10 illustrates an embodiment by means of which the squared voltages of the three units may be summed up and their sum indicated.

In Fig. 10, only the output coils 13a and 13b of each unit are shown and those of one unit are connected to a resistance heater coil 26, those of the second unit are connected to another resistance heater coil 27, and those of the third unit are connected to a third resistance heater coil 28. The heat generated in each of the heater coils is proportional to the square of the voltage and, therefore, if the heat produced by each heater is measured, the sum will be proportional to the total voltage squared ($E^2$).

Accordingly, means are now provided whereby the heat produced by each of said heater coils 26, 27 and 28 may be summed up and then indicated in terms of the strength of the external field being measured. As illustrated in Fig. 10, said means comprise three thermocouples 29, 30 and 31 which are respectively located in heat transfer relation with each of the heater coils 26, 27 and 28 as shown. By the action of the heat from each heater coil on its associated thermocouple, the latter generates a current which is proportional to the heat of the associated coil and, hence, to the square of the voltage which generates the heat. Now, by connecting said thermocouples in series with each other and with an ammeter 32, the currents are added together and their total sum indicated on said ammeter 32 which may be calibrated to indicate in terms of field strength.

It should be noted that although the composite magnetic pick-up devices have been described and illustrated with their individual units intersecting each other, this condition is not necessary so long as the field to be measured is equal in direction and strength at the location of each unit and there is no reaction between the units.

There is thus provided a novel electromagnetic induction device or magnetic field pick-up device that can be used as a magnetometer, or as an earth inductor compass, or as a magnetic pick-up device to provide a controlling function for remote indication or control, and one in which there is a substantially linear relation between the output voltage and the effective strength of the magnetic field, whereby the sensitivity and accuracy of the device is substantially improved, the linear relation being established by using magnetically permeable materials having the desired magnetic characteristics for the core means, and making the dimensions of said core means such as to establish a predetermined ratio of the length to the diameter or the cross-sectional area of said core means.

There is also provided a composite magnetic pick-up device composed of a plurality of pick-up units of the invention arranged in predetermined geometrical relation, whereby the device may be used as an earth inductor compass, and if the units are arranged in a different geometrical relation the composite device so formed becomes a non-directional device for measuring the strength of a magnetic field regardless of the orientation of the device in said field.

Although several embodiments of the invention have been illustrated and described, various changes in the form and relative arrangement of parts, which will now appear to those skilled in the art, may be made without departing from the spirit or scope of the invention. Reference is therefore to be had to the appended claims for a definition of the limits of the invention.

What is claimed is:

1. An electromagnetic induction device for magnetic pick-up comprising a plurality of units arranged in a predetermined geometrical relation adapted to be traversed by a uni-directional magnetic field, each of said units comprising a pair of separate spaced parallel core members of magnetically permeable material having substantially identical magnetic characteristics, a separate input or exciting winding on each of said core members, said windings being connected in series-opposed relation, an output winding wound about both of said core members as though they were a single member, and a source of periodically varying current connected to energize the exciting windings of all of said units for periodically saturating the core members thereof, whereby an alternating voltage is generated in each output winding from the uni-directional magnetic field traversing said core members, said generated voltages being even harmonics of the energizing current.

2. An electromagnetic induction device or magnetic pick-up comprising three magnetic pick-up units arranged in triangular relation adapted to be traversed by a uni-directional magnetic field, each of said units comprising a pair of separate spaced parallel core members of magnetically permeable material having substantially identical magnetic characteristics, a separate input or exciting winding on each of said core members, said windings being connected in series-opposed relation, an output winding wound about both of said core members as though they were a single unit, and a source of periodically varying current connected to energize the exciting windings of all of said units for periodically saturating their core members, whereby an alternating voltage is generated in the output winding of each unit from said uni-directional magnetic field, said voltages being even harmonics of the energizing current.

3. An electromagnetic induction device or magnetic pick-up comprising three individual magnetic pick-up units arranged in mutually perpendicular relation and adapted to be traversed by a uni-directional magnetic field, each unit comprising a pair of separate spaced parallel core members of magnetically permeable material having substantially identical magnetic characteristics, a separate input or exciting winding on each of said core members, said windings being connected in series-opposed relation, an output winding wound about both of said core members as though they were a single unit, and a source of periodically varying current connected to energize the exciting windings of all of said units for periodically saturating their core members, whereby an alternating voltage is generated in the output winding of each unit from said uni-directional magnetic field, said voltages being even harmonics of the energizing current.

4. An electromagnetic induction device or magnetic pick-up comprising a plurality of magnetic pickup units arranged to extend radially outward from a common point and equally angularly spaced and adapted to be traversed by a uni-directional magnetic field, each unit comprising a pair of separate spaced parallel core members of magnetically permeable material having substantially identical magnetic characteristics, a separate input or exciting winding on each of said core members, said windings being connected in series-opposed relation, an output winding wound about both of said core members as though they were a single unit, and a source of periodically varying current connected to energize the exciting windings of all of said units for periodically saturating their core members, wherey an alternating voltage is generated in the output winding of each unit from said uni-directional magnetic field, said voltages being even harmonics of the energizing current.

5. An electromagnetic induction device or magnetic pick-up comprising a pair of separate spaced core members of magnetically permeable material adapted to be traversed by a uni-directional magnetic field and having substantially identical magnetic characteristics, a separate input or exciting winding wound on each of said core members along substantially the entire length thereof, said windings being connected in series-opposed relation, an output winding wound about both of said core members as though they were a single member, and a source of periodically varying current connected to energize said exciting windings for periodically saturating said core members along substantially the entire length thereof, whereby an alternating current is generated in said output winding from said uni-directional magnetic field, said core members having the following characteristics whereby the relation between the output voltage and the strength of the uni-directional field will be substantially linear: ($a$) Initial permeability between 10,000 and 21,000, ($b$) maximum permeability between 61,500 and 105,000, ($c$) ratio of length to an equivalent diameter of the cross-sectional area of said core members between 10 to 1 and 60 to 1.

6. An electromagnetic induction device or magnetic pick-up comprising a pair of separate spaced parallel core members of magnetically permeable material adapted to be traversed by a uni-directional magnetic field and having substantially identical magnetic characteristics, a separate input or exciting winding wound on each of said core members along substantially the entire length thereof, said windings being connected in series-opposed relation, an output winding wound about both of said core members as though they were a single member, and a source of periodically varying current connected to energize said exciting windings for periodically saturating said core members along substantially the entire length thereof, whereby an alternating current is generated in said output winding from said uni-directional magnetic field, said core members having the following characteristics whereby the relation between the output voltage and the strength of the uni-directional field will be substantially linear: ($a$) Initial permeability between 10,000 and 21,000, ($b$) maximum permeability between 61,500 and 105,000, ($c$) ratio of length to an equivalent diameter of the cross-sectional area of said core members between 10 to 1 and 60 to 1, ($d$) flux density for maximum strength of said unidirectional field should be not greater than 60% of saturation.

7. An electromagnetic induction device or magnetic pick-up comprising three magnetic pick-up units arranged in triangular relation and adapted to be traversed by a uni-directional magnetic field, each of said units comprising a pair of separate spaced parallel core members of magnetically permeable material having substantially identical magnetic characteristics, a separate input or exciting winding on each of said core members, said windings being connected in series-opposed relation, an output winding wound about both of said core members as though they were a single unit, and a source of periodically varying current connected to energize the exciting windings of all of said units for periodically saturating their core members, whereby an alternating voltage is generated in the output winding of each unit from said uni-directional magnetic field, said voltages being even harmonics of the energizing current, and each pair of said core members having the following characteristics whereby the relation between the output voltage of said induction device and the strength of the uni-directional field will be substantially linear: ($a$) Initial permeability between 10,000 and 21,000, ($b$) maximum permeability between 61,500 and 105,000, ($c$) ratio of length to an equivalent diameter of the cross-sectional area of said core members between 10:1 and 60:1.

8. An electromagnetic induction device or magnetic pick-up comprising three magnetic pick-up units arranged in triangular relation and adapted to be traversed by a uni-directional magnetic field, each of said units comprising a pair of separate spaced parallel core members of magnetically permeable material having substantially identical magnetic characteristics, a separate input or exciting winding on each of said core members, said windings being connected in series-opposed relation, an output winding wound about both of said core members as though they were a single unit, and a source of periodically varying current connected to energize the exciting windings of all of said units for periodically saturating their core members, whereby an alternating voltage is generated in the output winding of each unit from said uni-directional magnetic field, said voltages being even harmonics of the energizing current, and each pair of said core members having the following characteristics whereby the relation between the output voltage of said induction device and the strength of the uni-directional field will be substantially linear: ($a$) Initial permeability between 10,000 and 21,000, ($b$) maximum permeability between 61,500 and 105,000, ($c$) ratio of length to an equivalent diameter of the cross-sectional area of said core members between 10:1 and 60:1, ($d$) flux density for maximum strength of said unidirectional field should be not greater than 60% of saturation.

9. An electromagnetic induction device or magnetic pick-up comprising three magnetic pick-up units arranged in triangular relation and adapted to be traversed by a uni-directional magnetic field, each of said units comprising a pair of separate spaced parallel core members of magnetically permeable material having substantially identical magnetic characteristics, a separate input or exciting winding on each of said core members, said windings being connected in series-opposed relation, an output winding wound about both of said core members as though they were a single unit, and a source of periodically varying current connected to energize the exciting windings of all of said units for periodically saturating their core members, whereby an alternating voltage is generated in the output winding of each unit from said unidirectional magnetic field, said voltages being even harmonics of the energizing current, and each pair of said core members having the following characteristics whereby the relation between the output voltage of said induction device and the strength of the uni-directional field will be substantially linear: (a) Initial permeability between 10,000 and 21,000, (b) maximum permeability between 61,500 and 105,000, (c) ratio of length to an equivalent diameter of the cross-sectional area of said core members between 10:1 and 60:1, (d) flux density for maximum strength of said uni-directional field should be not greater than 60% of saturation, (e) cross-sectional area should be such that for maximum strength of said uni-directional field said core members will not approach saturation by said field.

10. A system for indicating the field strength of magnetism comprising in combination three magnetometer cores of magnetic material having their principal magnetic axes mutually perpendicular, windings for each core, a source of alternating current connected to windings of each magnetometer whereby second harmonic voltages are produced therein of magnitudes proportional respectively to the product of the field strength and the direction cosine of the angle formed between the principal axis of each core and the direction of the magnetic field, an electric heating means coupled to each winding to produce heat proportional respectively to the squares of the produced second harmonic voltages, and an indicating means responsive to the sum of the heats produced whereby the indications are caused to vary as a function of the strength of the magnetic field.

11. A system for determining the field strength of magnetism comprising in combination three magnetometers having cores of magnetic material with their principal magnetic axes mutually perpendicular, windings for each core, a source of alternating current connected to windings of each magnetometer whereby second harmonic voltages are produced therein of magnitudes proportional respectively to the product of the field strength and the direction cosine of the angle formed between the principal axis of each core and the direction of the magnetic field, an electric heating means coupled to each winding to produce heat proportional respectively to the squares of the produced second harmonic voltages, and means responsive to the sum of the heats produced by said electric heating means for producing an effect which varies as a function of the strength of the magnetic field.

12. A flux valve for use in a remote reading compass system comprising three relatively angularly disposed inductors each including a pair of separate spaced parallel core members of permeable magnetic material having substantially identical magnetic characteristics, means for producing a pulsating flux in the core members of each inductor, said means including a separate input or exciting winding wound on each of said core members along substantially the entire length thereof, and a source of periodically varying current connected to energize said exciting windings for periodically saturating said core members along substantially the entire length thereof, said means producing flux flowing in the members of each inductor in respectively simultaneously opposite directions, and pick-up windings associated with each inductor and respectively comprising convolutions each encircling both core members of the inductors whereby potentials of a frequency equal to the periodicity of said varying flux will be substantially balanced out in said pick-up windings while alternating voltages produced through interaction between said inductors and an external field will be provided as a signal output by said pick-up windings.

13. A flux valve for use in a remote reading compass system comprising three relatively angularly disposed inductors each including a pair of separate spaced core members of permeable magnetic material, a coil on each core member adapted when energized from a source of periodically varying electrical energy to produce peridi-cally varying flux in said separate spaced core members, said flux flowing in said members in respectively, simultaneously opposite directions, and pick-up windings associated with each inductor and respectively comprising convolutions each encircling both core members of the inductors whereby potentials of a frequency equal to the periodicity of said varying flux will be substantially balanced out in said pick-up windings while alternating voltages produced through interaction between said inductors and an external field will be provided as a signal output by said pick-up windings.

14. An electrical inductive device for producing through interaction with a unidirectional external magnetic field a three-circuit, variable alternating potential output and in which the alternating E. M. F. in each circuit varies with the orientation of the device in the magnetic field, said device comprising an inductor having three core legs of permeable magnetic material equi-angularly disposed with respect to one another in triangular fashion, each of said legs including a pair of separate spaced parallel core members of magnetically permeable material adapted to be traversed by said uni-directional magnetic field and having substantially identical magnetic characteristics, a coil wound on each core member along substantially the entire length thereof and adapted to be connected with a source of single phase alternating energizing current for producing periodically varying fluxes in said core members periodically substantially saturating said core members along substantially the entire length thereof, and a pick-up coil associated with each core leg for generating varying potentials under the influence of said external magnetic field upon said core legs, whereby an alternating voltage is generated in each pick-up coil from the external magnetic field traversing said core members, said generated alternating voltage having a frequency dependent upon that of the energizing current.

15. An electrical inductive device for producing through interaction with a unidirectional external magnetic field a three-circuit, variable alternating potential output and in which the alternating E. M. F. in each circuit varies with the orientation of the device in the magnetic field, said device comprising an inductor having three substantially coplanar core legs of permeable magnetic material equiangularly disposed with respect to one another in a predetermined geometrical relation, each of said legs including a pair of separate spaced core members of permeable magnetic material, the separate spaced core members of each leg extending longitudinally in parallel relation one to the other, a coil on each core member adapted to be connected with a source of single phase alternating energizing current for producing periodically varying fluxes in said separate spaced core members, and a pick-up coil associated with each core leg for generating varying potentials under the influence of said external magnetic field upon said inductor, whereby an alternating voltage is generated in each pick-up coil from the external magnetic field traversing said core members, said generated alternating voltage having a frequency correlated with that of the energizing current.

16. An electrical inductive device comprising a plurality of relatively angularly disposed inductors each including a pair of separate spaced core members of magnetically permeable material, a coil disposed about one of said core members, another coil disposed about the other of said core members, said coils adapted for energization from a source of periodically varying electrical energy to produce periodically varying flux in said separate spaced core members, said flux flowing in said members in respectively, simultaneously opposite directions, and pick-up windings associated with each inductor and respectively comprising convolutions each encircling both core members of the inductors so that periodically varying voltages produced through interaction between said inductors and an external field will be provided as a signal output by said pick-up windings.

17. An electrical inductive device for producing through interaction with a unidirection external magnetic field a periodically varying signal voltage output and in which the periodically varying signal voltage varies with the orientation of the device in the magnetic field, said device comprising a plurality of core legs disposed with respect to one another in a predetermined geometrical relation, each of said legs including a pair of separate spaced core members of magnetically permeable material for receiving flux from said external magnetic field, the separate spaced core members of each leg extending longitudinally in generally parallel relation one to the other, a coil disposed about one of said core members, another coil disposed about the other of said core members, said coils adapted to be connected with a source of periodically varying current for producing periodically varying fluxes in said separate spaced core members, said flux flowing in said core members in respectively, simultaneously opposite directions, pick-up coil means associated with each core leg, and at least one of said pick-up coil means having generated therein under the influence of the flux of said external magnetic field received in the core members a periodically varying voltage having a frequency correlated to the frequency of said source of current to provide a signal output which varies with the position of said inductive device in the external magnetic field.

References Cited in the file of this patent

UNITED STATES PATENTS

| | | |
|---|---|---|
| Re. 22,699 | Stuart | Nov. 27, 1945 |
| 400,862 | Lowrie | Apr. 2, 1889 |
| 2,053,154 | La Pierre | Sept. 1, 1936 |
| 2,158,500 | Guerra | May 16, 1939 |
| 2,383,459 | Beach | Aug. 28, 1945 |
| 2,383,460 | Purves | Aug. 28, 1945 |
| 2,388,070 | Middel | Oct. 30, 1945 |
| 2,476,273 | Beach | July 19, 1949 |
| 2,485,931 | Slonczewski | Oct. 25, 1949 |

OTHER REFERENCES

"Eine Anordnung zür Registrierung raschermagnetsicherstorungen," pp. 177–181 of Hochfrequenztechnik und Elektroakustik, Band 47, June 1936, Heft 6.